(12) United States Patent
Lopez et al.

(10) Patent No.: US 8,200,150 B2
(45) Date of Patent: Jun. 12, 2012

(54) AUTOMATIC SATELLITE ACQUISITION SYSTEM FOR A PORTABLE SATELLITE TERMINAL

(75) Inventors: Jason Lopez, Vancouver (CA); Glen Dwornik, New Westminster (CA); Petrus Bezuidenhout, Port Coquitlam (CA); Michael Schefter, Vancouver (CA); Stanislav Kouzmine, Surrey (CA); Sasa Trajkovic, Burnaby (CA)

(73) Assignee: Norsat International Inc., Richmond, CA (US)

( * ) Notice: Subject to any disclaimer, the term of this patent is extended or adjusted under 35 U.S.C. 154(b) by 1722 days.

(21) Appl. No.: 11/309,307

(22) Filed: Jul. 25, 2006

(65) Prior Publication Data
US 2010/0045510 A1 Feb. 25, 2010

(51) Int. Cl.
*H04B 7/19* (2006.01)
(52) U.S. Cl. ........ 455/13.2; 455/13.3; 455/25; 333/233; 333/223; 333/231; 343/711; 343/712; 343/714; 343/761; 343/880

(58) Field of Classification Search .............. 455/13.2, 455/13.3, 25; 333/233, 223, 231; 343/711, 343/712, 714, 761, 763, 765, 766, 781, 782, 343/840, 880, 881, 882, 359; 342/352, 356, 342/359, 362
See application file for complete search history.

(56) References Cited

U.S. PATENT DOCUMENTS 7,432,868 B2 * 10/2008 Webb et al. ............... 343/766
2002/0057225 A1 * 5/2002 Spirtus ...................... 343/766
* cited by examiner

*Primary Examiner* — Fayyaz Alam

(57) ABSTRACT

A system for accurate automatic satellite acquisition by a portable satellite terminal. The system includes a software program that coordinates inputs from several measurement aids to control antenna position. These aids include a GPS receiver, antenna azimuth, elevation and polarization angle sensors, and the terminal's modem, DVB receiver and spectrum analyzer, which contains a beacon detector also serving as Receive Signal Strength Indicator (RSSI). For satellite recognition, the spectral analysis and RSSI function are complemented by the lock/unlock indications provided by the modem and the DVB receiver. Under the control of the software program, the modem, DVB receiver and spectrum analyzer, in conjunction with an extensive database of satellites and their signal characteristics, provide the means for reliable validation of final alignment.

22 Claims, 6 Drawing Sheets

AUTOMATIC SATELLITE ACQUISITION SYSTEM FOR A PORTABLE SATELLITE TERMINAL

FIELD OF THE INVENTION

The present invention relates to satellite acquisition systems for portable terminals.

BACKGROUND OF THE INVENTION

Typically, portable satellite terminals are used in Satellite News Gathering (SNG) and in military communication systems. Particularly in the latter case, it is important to achieve the right balance between antenna size (affecting portability), good performance and ease of setup.

Prior art auto-acquire systems for satellite terminals typically contain the following hardware and software elements:
1) Antenna positioners (i.e. for elevation, azimuth and polarization adjustment). The polarization angle may be adjusted by rotating the whole antenna but it is more common to rotate only the feed.

An important aspect of antenna positioning systems is an accurate indication of the current azimuth, elevation and polarization angle. Those data serve as feedback for the initial pointing in the satellite acquisition process. Such feedback is generally in the form of a suitable electrical quantity, such as voltage. There are several patents dealing with motorized antenna alignment; examples of these are U.S. Pat. Nos. 4,665,401, 4,907,003, 6,049,306, 6,937,119, 5,594,460.

The disadvantage of the prior art systems is the relatively low accuracy and resolution and the susceptibility to slippage or backlash, depending on the method of mechanical coupling to the sensors for azimuth, elevation and polarization angles.
2) A location determining device, typically a GPS receiver. This provides the terminal's longitude and latitude, which are used, in conjunction with the satellite data, to calculate the look angles for the initial pointing of the antenna. It would be advantageous to have alternate or back-up means for determination of the terminal's location and for inputting this data into the system in the event of GPS failure.
3) An indicator of signal strength, (e.g. a beacon detector or an AGC (Automatic Gain Control) circuit). In the prior art the indicator of signal strength is generally the final arbiter in the alignment, (e.g. U.S. Pat. Nos. 4,907,003, 6,049,306, 5,422,648, application US 20050248498, Canadian patent CA 1327076 and international patent application WO2005053093), however, depending on the accuracy of the initial pointing and the location of the chosen satellite, such systems may still lead to alignment on another satellite, spaced a small angle apart from the desired one. This emphasizes again the need for accurate sensors for the initial alignment. Even more importantly, it is also desirable to have means to validate alignment.
4) A "satellite recognizer" to detect satellite characteristics. A prior art example wherein a spectrum analyser is used to perform this function, is disclosed in WO 02078215. However, in that application the spectrum analyser and corresponding control software are located in a central station of a network of satellite terminals and the data for antenna positioning are distributed to a network of individual satellite terminals via a separate radio network. Further, such prior art portable terminals are not equipped with full-featured spectrum analysers. Thus there exists a need in the prior art for a high-performance, compact, low cost satellite recognizer concept that can be incorporated into portable satellite terminals.

Accordingly, it is an object of the present invention to provide improved satellite acquisition systems and software, having features that address the deficiencies of the prior art described above.

SUMMARY OF THE INVENTION

The present invention is an improved portable system for satellite acquisition including improved hardware and software components having the following features:
- Utilization of functional blocks, normally used for signal processing and checking, for antenna alignment and satellite recognition. These functional blocks are the modem, DVB receiver and a simple spectrum analyser circuit. In prior art portable terminals, spectrum analyser circuits have been used to check the quality of transmitted signals, however, in the present invention they are additionally used to aid with satellite recognition.
- User-specified central profiles including satellite, frequency and modem settings, (e.g. bit rate and FEC (Forward Error Correction) parameters). The profiles provide for complete control of modems. The user can set all modem-specific settings in one or more central profiles, along with other parameters necessary for successful operation of the session.
- Selection of a nearby city or landmark in case of GPS failure. In the preferred embodiment the terminal includes a database of world cities and/or landmarks (e.g. over 3400 cities). Latitude and longitude can be also entered manually.
- Correction for magnetic declination of the compass with respect to "true North" when determining azimuth.
- Checking whether the satellite is in view.
- Guidance for repositioning the terminal when there are alignment problems (e.g. due to obstructions in front of the terminal such as tall buildings, and/or if a different satellite has to be used).
- Use of reference satellites to align the antenna in the event that the desired satellite does not transmit signals suitable for the alignment process.
- Methodical process of slewing the azimuth and elevation.
- Method of calibration in order to correlate motor movement to real antenna movements, thus resulting in precise positioning information and therefore more precise positioning.
- Satellite recognition process using a database of satellite characteristics.
- Azimuth and elevation peaking followed by another satellite recognition step.
- Polarization peaking.
- Guidance for the cross-polarization access test and prompt to start transmission.
- Automatic power control mechanism to maintain quality of transmission.

In its preferred embodiments, the current invention is applied to small portable satellite terminal applications.

One embodiment of the invention comprises a method of accurately determining the peak polarization of a communication signal by making a first group of signal strength measurements, wherein this first group of signal strength measurements includes a pair of measurements at each frequency in a first group of frequencies in a receive band of the signal, one measurement with the antenna set to a polarization angle close to that of home polarization and one at a polarization opposite to (i.e. 90 degrees from the home polarization) said home polarization. The frequencies in the first group of frequencies having the greatest difference between the home polarization and opposite polarization measurements is then selected.

A second group of signal strength measurements is then made, wherein the second group of signal strength measurements includes pairs of measurements at the selected frequencies. The second group of measurements also includes one measurement at the home polarization and a second measurement at the opposite polarization.

The frequency for which the second group of signal strength measurements displays the lowest variability is then identified. A third group of signal strength measurements is made at the identified frequency, wherein the third group of signal strength measurements includes measurements at a range of polarizations angles about the home polarization. For each of these polarizations angles the average signal strength is calculated.

The average signal strength measurements are then approximated using a mathematical function, which is adjusted until a lowest sum-of-squares difference between the function and the average signal strength measurements is found. The peak of the function is the peak polarization of the communication signal.

An alternate embodiment of the invention relates to a method of calibrating a satellite terminal having a step motor for moving an antenna and a sensor for sensing the position of the antenna. The antenna is moved to a first position using the step motor, and a first position value corresponding to the first position is read from the sensor. The antenna is then moved to a second position using the step motor, the steps of the step motor between the first position and the second position are counted and a second position value is read from the sensor corresponding to the second position. If there is some slack or backlash in the positioning mechanism, the above step count is appropriately modified by a number of motor steps, previously experimentally determined as corresponding to the slack/backlash. The number of step motor steps occurring per degree change in angular position of said antenna is then calculated. The sensor may be an azimuth, elevation or polarization sensor.

In yet a further embodiment, the invention comprises a method of accurately positioning an antenna of a satellite terminal. An anchor position for the antenna is defined, at which the step motor position counter is set to zero. The antenna is positioned at the anchor position using the step motor, and an anchor position value provided by the sensor. As the antenna is scanned in the satellite acquisition process, its precise position at any given time is determined by dividing the step motor position (step count from the anchor position) by the number of steps per degree determined in the calibration process thus obtaining the change in angular position of the antenna. The anchor position value from the sensor is then added to the computed angular change in position to determine a computed angular position value. The computed angular position value is then periodically compared to the corresponding sensor reading and in case of disagreement, the anchor position can be gradually adjusted such that the computed angular position value falls within the resolution range of the sensor.

In a further embodiment, the invention contemplates a method for calibrating and accurately positioning an antenna of a satellite terminal. An anchor position for the antenna is defined and the antenna position in the anchor position using the step motor. The step motor counter is set to zero at the anchor position and an anchor position value is read from the sensor. The antenna is then positioned in a first position using the step motor, and a first position value is read from the sensor and a first step motor position is read from the counter. The first step motor position is divided by a difference between the anchor position value and the first position value to determine a number of step motor steps per unit change in angular position of the antenna. The antenna is then positioned in a second position using the step motor, a second position value read from the sensor and a second step motor position corresponding to the second position read from the counter. The second step motor position is divided by the number of step motor steps per unit change in angular position of the antenna to determine a computed angular change in position. The anchor position value is added to the computed angular change in position to determine a computed angular position value. The anchor position is adjusted to bring the computed angular position value closer to the second position value, if a difference between the computed angular position value and the second position value exceeds a predetermined threshold.

In yet a further embodiment the invention comprises a portable satellite terminal having a database of landmarks, including the latitude and longitude for each of the landmarks. The terminal also comprises a database of satellites, including position information for the satellites. Finally, the terminal comprises processing means (such as a computer, circuit, processor and/or software) for determining the approximate elevation and azimuth of a selected satellite from locations proximate the landmarks in the database of landmarks. A corresponding method for determining the approximate azimuth and elevation of a satellite also falls within the scope of the present invention. Using the satellite terminal described above, first a landmark is selected from the database, said selected landmark being proximate the location of the portable satellite terminal. A satellite is also selected from the database of satellites. Then, using the latitude and longitude of the selected landmark, and position information of the selected satellite, the approximate azimuth and elevation of the selected satellite is calculated by the processing means.

In a further embodiment, the present invention comprises a method of acquiring and recognizing a satellite signal, using a portable satellite terminal having a spectrum analyser containing a beacon detector (that can act as a beacon detector and also function as a receive signal strength indicator), a modem, a digital video broadcast receiver and an antenna. First the antenna is pointed and slewed in the approximate direction of a known satellite. When the beacon detector detects a rise in signal strength the slewing is slowed down. The frequency of the signal is measured, using the spectrum analyser, and either the modem or the digital video broadcast receiver is locked onto a carrier in the unknown signal (if the carrier has a pattern matching the carrier pattern expected from the satellite). The signal is recognized as coming from the satellite if the frequency of the signal matches the expected frequency and the pattern matches the expected carrier pattern.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION OF THE INVENTION

The auto-acquire system of this invention can be incorporated into communication units capable of transmitting/receiving high-speed data and quality video via satellite. To achieve good performance while preventing undue interference to or from other systems, a reasonable size (e.g. around 1-meter) parabolic antenna is preferred, together with an RF amplifier capable of 10 W-40 W of RF power. For automatic satellite acquisition, such a terminal is equipped with a motorized positioner. The auto-acquisition system of the present invention may be incorporated into communications terminals of varying designs. However, since the auto-acquire system is dependent to some degree on terminal configuration, the next few paragraphs deal briefly with overall terminal design.

Figure 1:
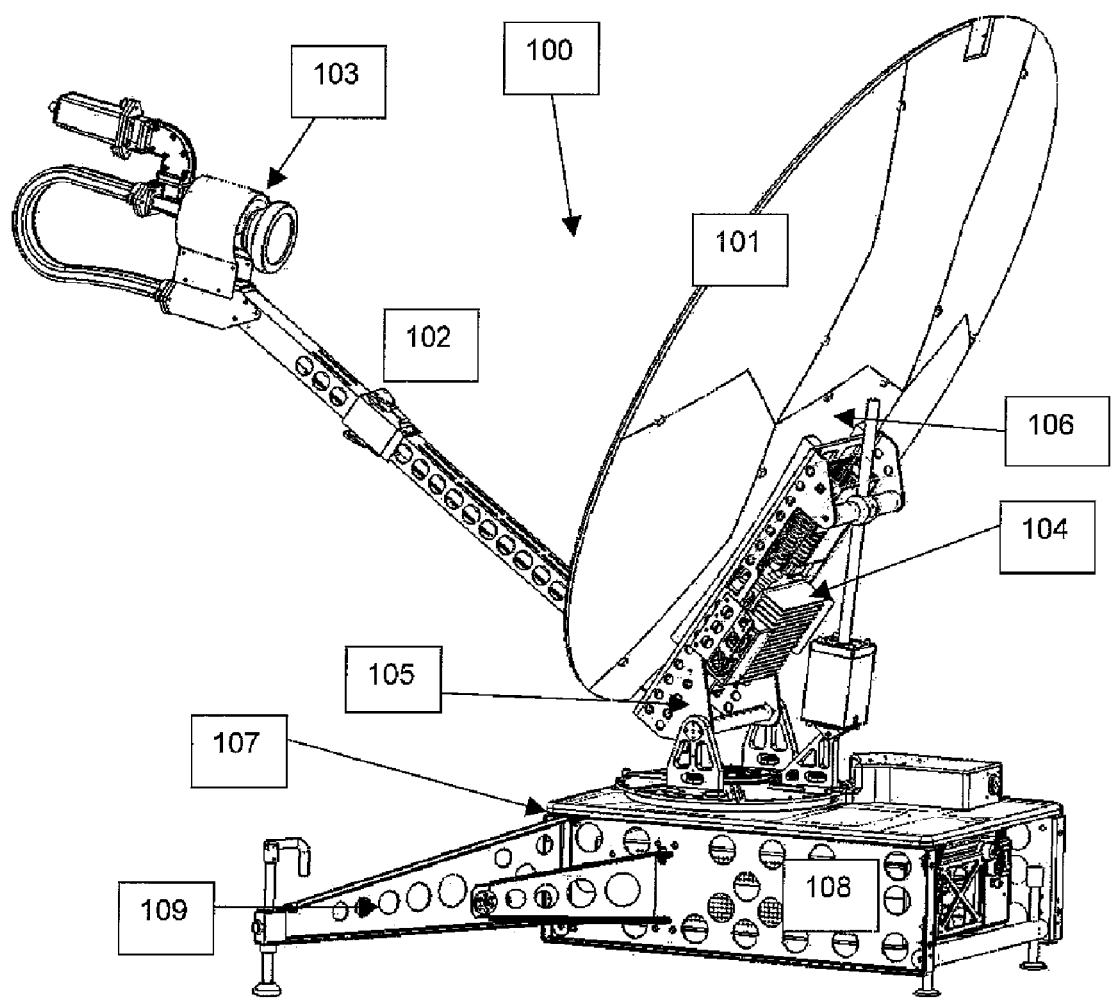
FIG. 1 depicts a portable satellite terminal.

As shown in FIG. 1, an exemplary satellite terminal 100 contains a single-offset parabolic antenna consisting of a 1 m diameter parabolic segmented antenna reflector 101 with and a boom assembly 102, having a OMT/Feed subassembly 103 mounted on the end. The boom assembly 102 preferably breaks into two parts for disassembly and transport. On the lower back part of the antenna reflectors 101, the RF transmit (Tx) electronics assembly 104 is mounted to a U-shaped carrier 105 that in turn is attached to the main segment 106 of the antenna reflector. When the satellite terminal 100 is deployed, as shown in FIG. 1, the main reflector segment 106 with carrier 105 and RF transmit electronics assembly 104 is mounted on the baseband housing 107 (i.e. the housing for the "non-RF", or "baseband" (BB) electronics). The other reflector segments are then added and the boom assembly 102 is "plugged" into a receptacle at the bottom of the carrier 105. The baseband housing 107 has a main body 108 and foldable legs 109, which together act as a tripod, providing a stable platform for the satellite terminal 100. The top of the baseband housing 107 contains the positioner elements for azimuth and elevation adjustment of the antenna. The polarization adjustment of the antenna is physically separated from the azimuth/elevation elements and is part of the OMT/Feed subassembly 103 at the end of boom assembly 102.

Figure 2:
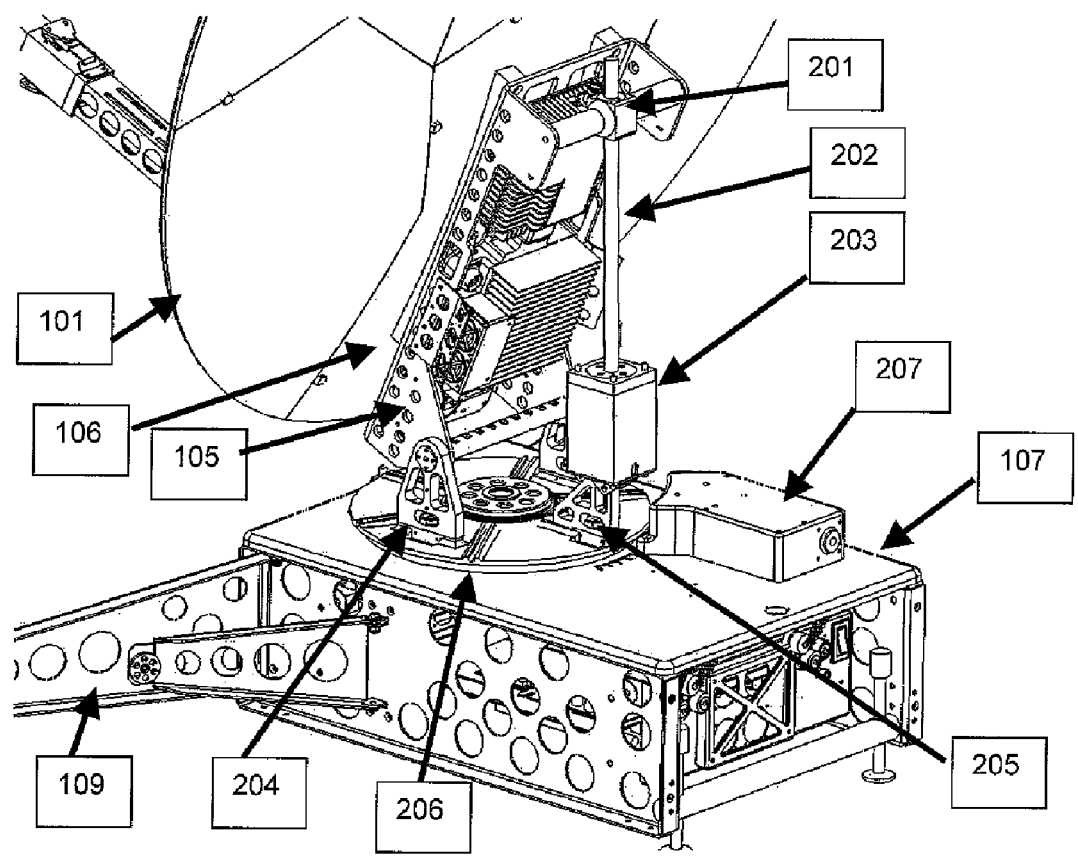
FIG. 2 is a close-up view of the azimuth and elevation subassemblies of the portable satellite terminal of FIG. 1.

FIG. 2 shows in greater detail how the reflector 101 is mounted to the baseband housing 107. The main reflector segment 106 is attached to the U-shaped carrier 105 on which is mounted the RF transmit (Tx) electronics assembly 104. The U-shaped carrier 105 also has connected to it the elevation subassembly of the antenna positioner, namely, gear 201, elevation rod 202 and elevation motor subassembly 203. The whole antenna assembly (antenna reflector 101, RF transmit (Tx) electronics assembly 104, U-shaped carrier 105 with boom 102 plugged into it, and the elevation subassembly) is mounted, via hinges 204 and 205, on the rotational platform 206 for azimuth alignment driven by the drive unit 207. The platform 206 and the drive unit 207 are parts of the azimuth subassembly of the antenna positioner that in turn is part of the baseband housing 107.

Figure 3:
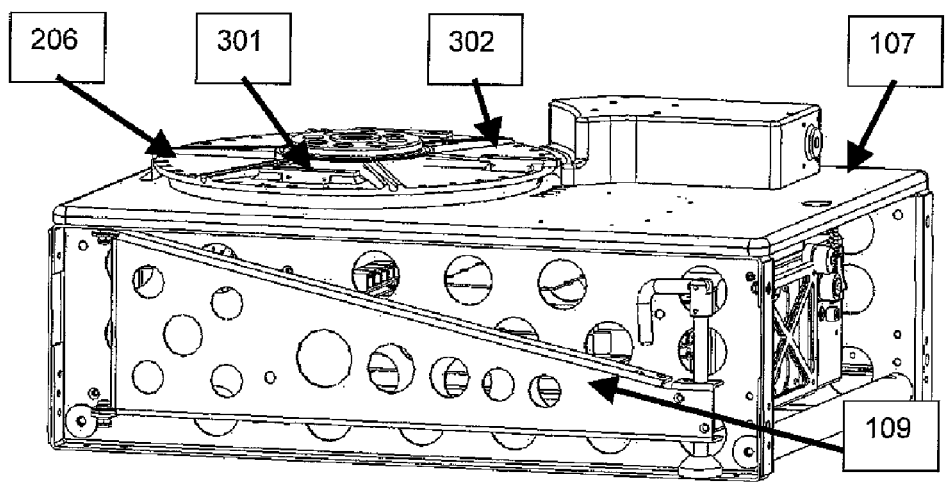
FIG. 3 depicts the electronics box of the portable satellite terminal of FIG. 1, with the antenna removed.

FIG. 3 shows the baseband housing 107 with the legs 109 folded, after removal of the antenna assembly from rotational platform 206. Attachment points 301 are for the attachment of the hinges 204 (see FIG. 2). Attachment point 302 is for attaching the elevation hinge 205 (see FIG. 2).

Figure 4:
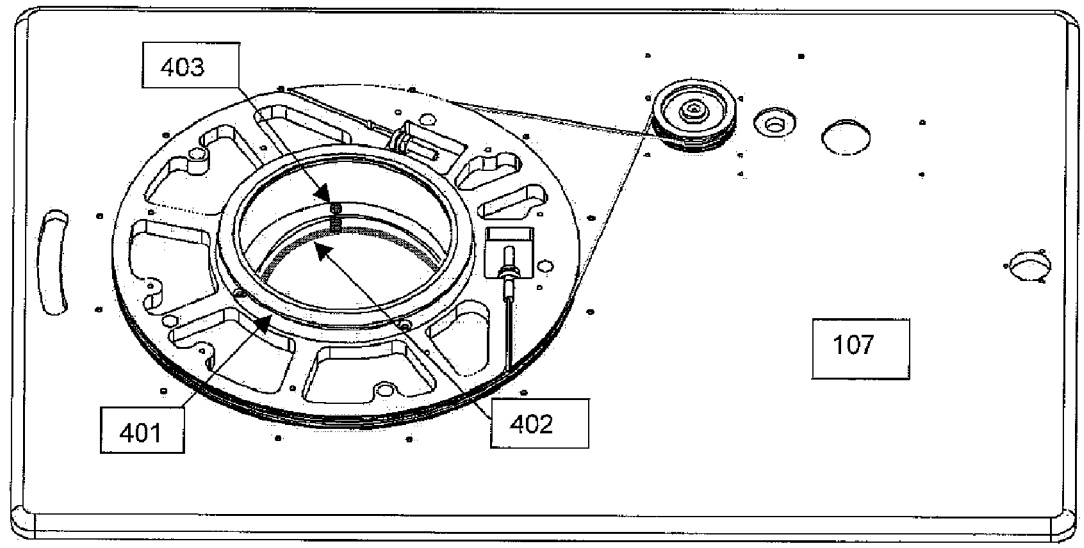
FIG. 4 is a simplified top perspective view of the azimuth assembly on the electronics box of the portable satellite terminal of FIG. 1.
Figure 5:
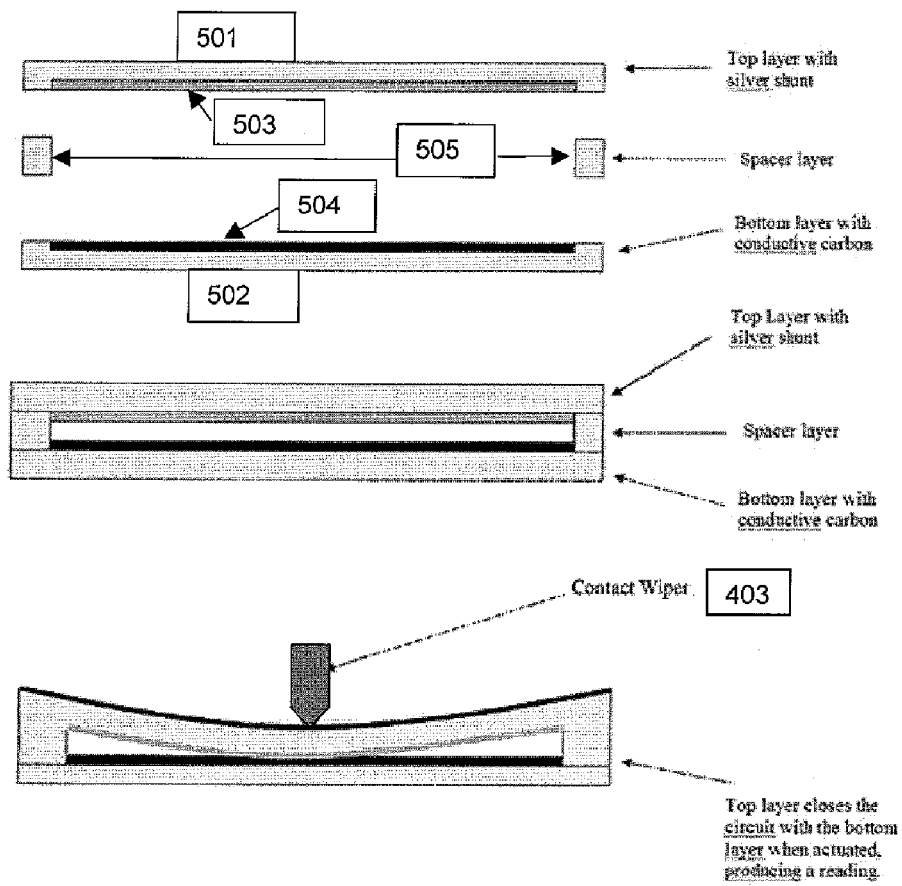
FIG. 5 shows the construction of the rotary sensing potentiometer.

FIGS. 4 and 5 show a simplified top perspective view of the azimuth assembly showing the placement of the azimuth angular sensor and a cross-sectional view of the rotary potentiometer 402:

Rotary potentiometer 402 is attached below drum 401 (which is part of rotational platform 206) to a bearing plate that in turn is fixed to the lid of the baseband housing 107. As shown in FIG. 5, it is made up of two dielectric layers 501 and 502, one of which contains a circular conductive trace 503 serving as the potentiometer wiper and the other a resistive circular trace 504, said traces being on the adjacent sides of the dielectric layers that are separated by a spacer layer 505.

Plunger subassembly 403 has a spring-loaded plunger in a tubular carrier which is attached to the underside of drum 401, thus turning with the drum. As demonstrated in FIG. 5, due to the spring-induced downward pressure the plunger connects the traces 503, 504 of potentiometer 402 together at a point directly under the plunger subassembly 403.

A circuit (not shown), connected to the rotary sensing potentiometer 402. The circuit is mounted on the underside of baseplate 107. The circuit applies dc voltage to the two ends of the circular resistive trace 504 in potentiometer 402 and outputs the voltage between the conductive trace 503 and one of the ends of the resistive trace 504 to an Analog-to-Digital Converter (ADC) connected to the circuit. The voltage is proportional to the angle of rotation of drum 704. The ADC converts this voltage value from its analog form to a digital value for further processing. The ADC is preferably a 10-bit device, therefore, theoretically the voltage will be represented by $2^{10}=1024$ values. Of this, the actual usable range is closer to about 800, so each 1-bit step corresponds to $360/800$=approximately a 0.5 degree change in the antenna azimuth position. To ensure accurate correlation with the real antenna position, a calibration process (explained in detail below) is used.

The unique design of the rotating drum with the built-in plunger riding on the circular potentiometer has the advantage that it provides a more accurate indication of the antenna azimuth angle, with better resolution and freedom from slippage or backlash. Although in the preferred embodiment the present invention is used in conjunction with a portable terminal having an azimuth assembly similar to that described above, it may be used in conjunction with other azimuth sensing and adjustment mechanisms.

Figure 6:
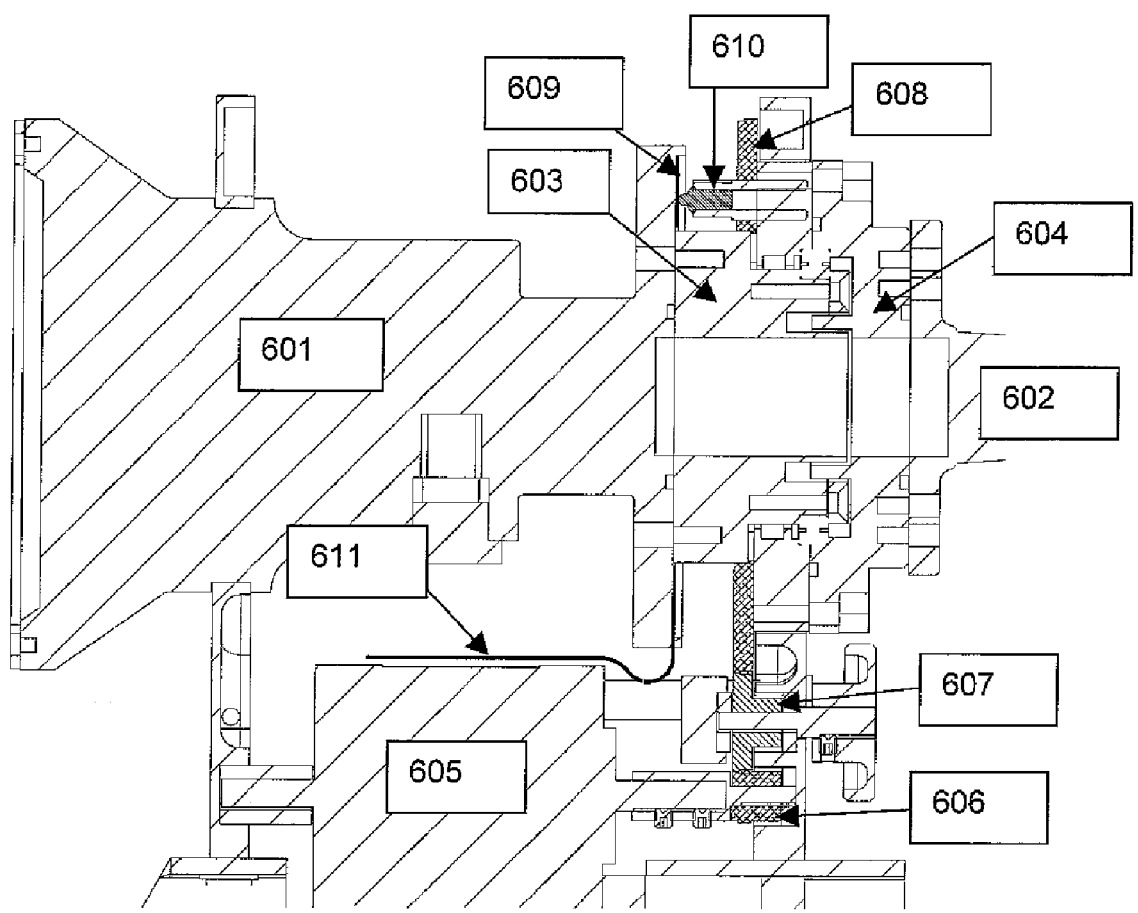
FIG. 6 shows the polarisation angular sensor in the feed assembly.

FIG. 6 is a cross-sectional detail of the OMT/Feed subassembly 103, where the feed provides illumination of the reflector and the OMT separates the transmit and receive signals. Feed 601 is stationary and a rotary joint is used to interface it with OMT 602 (only the flange of the OMT is shown). Feed 601 is attached to the fixed part 603 of the rotary joint, while the rotating part 604 of the rotary joint is attached to OMT 602, thus enabling OMT rotation with respect to the feed 601. The rotating part 604 of the rotary joint is turned by motor 605 through gears 606, 607 and 608.

FIG. 6 also shows how the polarisation angle sensor is incorporated into the OMT/Feed subassembly 103. The flange of feed 601 has attached to it the rotary sensing potentiometer 609. The rotating part 604 of the rotary joint, attached to OMT 602, has mounted on it spring-loaded plunger 610, pushing on potentiometer 609 such that the resistive and conductive traces of the rotary potentiometer 609 are brought into contact with one another at a point of contact beneath the plunger 610. The output cable 611 of the potentiometer leads to a connector (not shown). At this connector a voltage proportional to the position of the plunger 610, and therefore the polarization angle, is available for feedback to the auto-acquire system of the terminal. Again, as in the case of the azimuth sensor, this analog voltage is converted to a digital form for further processing. With a 10-bit ADC, 0.5 degree steps in polarization angle are obtained.

The polarisation angle sensor provides better accuracy, resolution and freedom from slippage and/or backlash compared to other approaches. Although in the preferred embodiment the present invention is used in conjunction with a portable terminal having an polarisation sensing and adjustment assembly similar to that described above, it may be used in conjunction with other polarisation sensing and adjustment mechanisms.

Figure 7:
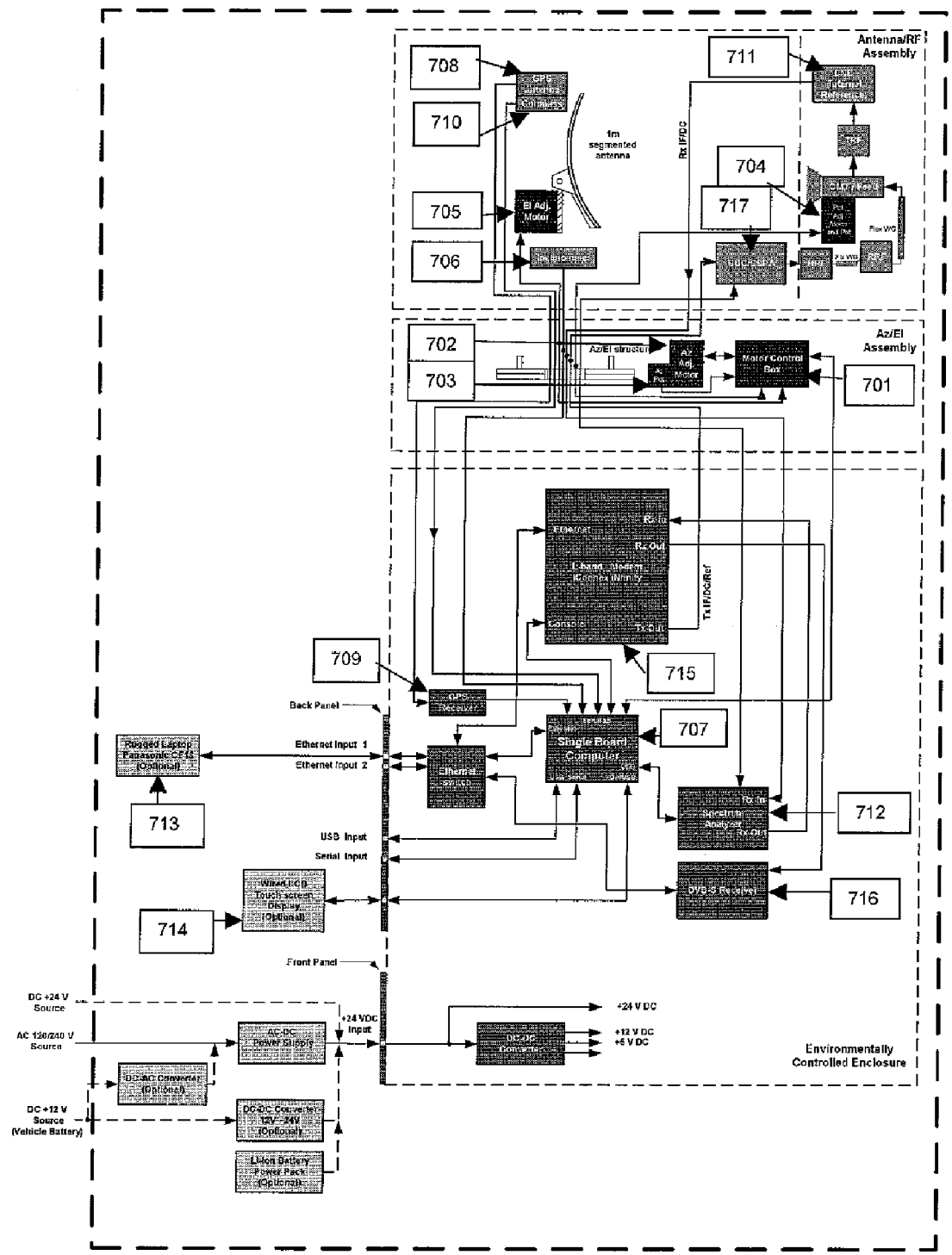
FIG. 7 is a simplified block diagram of the portable satellite terminal of the present invention, containing the elements of the auto-acquire system.

FIG. 7 shows a block diagram of the portable satellite terminal of the present invention, including elements of the auto-acquire system. Motor Control box 701 interfaces with azimuth adjustment motor 702 (that is part of drive unit 207) azimuth angular sensor 703, (composed of previously described rotary potentiometer 402, plunger 403, circuit and ADC (Analog-to-Digital Converter)) polarization adjustment motor/sensor 704 (composed of parts 605-611 in FIG. 6) and elevation adjustment motor 705 (which is part of elevation motor subassembly 203). The elevation sensor, namely inclinometer 706, interfaces directly with computer 707, as does the GPS receiver 709 with its antenna 708, and compass 710. Computer 707 also controls the aforementioned Motor Control box 701.

The satellite signal received and down-converted by LNB 711 (Low-Noise Block down-converter) in the antenna/RF assembly is passed on to spectrum analyser 712 which is controlled by computer 707 (in the preferred embodiment computer 707 is a single-board computer or a circuit). The spectrum analyser 712 contains a beacon detector that can also function as a Receive Signal Strength Indicator (RSSI) in the initial part of the satellite acquisition process. Later in the satellite acquisition process the spectrum analyser 712 is directed by the computer 707 to do a spectral analysis of the signal for the purpose of recognizing a given satellite's spectral characteristics. The spectrum can be displayed on, for example, the screen of a laptop 713 or on a wired LCD touch screen 714.

A sample of the original received signal is sent from the spectrum analyser 712 to modem 715 for digital data processing. In conjunction with the spectrum analyser 712, the modem 715 provides information on signal strength as well as for satellite recognition by providing a lock/unlock indication signal for data carriers expected at certain frequencies in the spectrum.

The original received signal passes through modem 715 to DVB (Digital Video Broadcast) receiver 716 for the processing of video portions of the satellite signal. Again, the DVB receiver, similar to the modem, provides additional satellite recognition information by providing a lock/unlock indication for digital video carriers expected at certain frequencies in the spectrum. Thus the combination of the modem, DVB receiver and the spectrum analyser, (with its spectral analysis, beacon detection and RSSI function) can be used for the assessment of both signal strength as well as signal characteristics, recognizing data and video carriers that may be present. This aids in the satellite acquisition and recognition process.

Satellite acquisition is controlled by a software program which controls the modem, allowing the auto-acquire system to gather information from the modem. The software also allows the user to set all modem-specific settings, such as Tx and Rx frequency, bit rate, FEC (Forward Error Correction), etc., in a central profile, along with other parameters necessary for the successful operation of the auto-acquire system, (e.g. satellite name and position and certain terminal characteristics like Tx power capability, LNB Local Oscillator frequency, losses in interconnecting cables, etc.). The user does not need to know how to control the modem at all—the software handles all modem interactions.

The software allows the user to set the RF power and to control the power by using feedback from a sensor at the output of the power amplifier 717 to the modem. When the ambient temperature changes, affecting the amplifier gain, the software directs the modem to adjust its output to keep the RF power from the amplifier, (and therefore the radiated power from the antenna) constant.

In the satellite acquisition process, the software uses the information from the azimuth angular sensor 703, elevation sensor 706 and the polarization angle sensor in polarization subassembly 704 as feedback for initial positioning. The more accurate the sensors are, the faster the whole process will be. In the subsequent stages of acquisition, the software utilizes a built-in auto-calibration system (described below in detail) that relates the movements of positioning motors 702, 705 and 704 to real movements of the antenna 101 and OMT/Feed subassembly 103. As a result, the antenna 101 and OMT/Feed subassembly 103 can be moved precisely and with smooth accelerations and decelerations. In addition, by computing the relationship between motor position and real-position (as indicated by the sensors), the software can obtain even more precise positioning information than that provided by the sensors for the initial pointing. This is because the number of motor steps over the complete angular range is much higher than the number of voltage steps from any given sensor over that same angular range. Thus one motor step corresponds to a much smaller angle increment or decrement than that corresponding to the difference between two successive voltage steps from the sensor.

Figure 8:
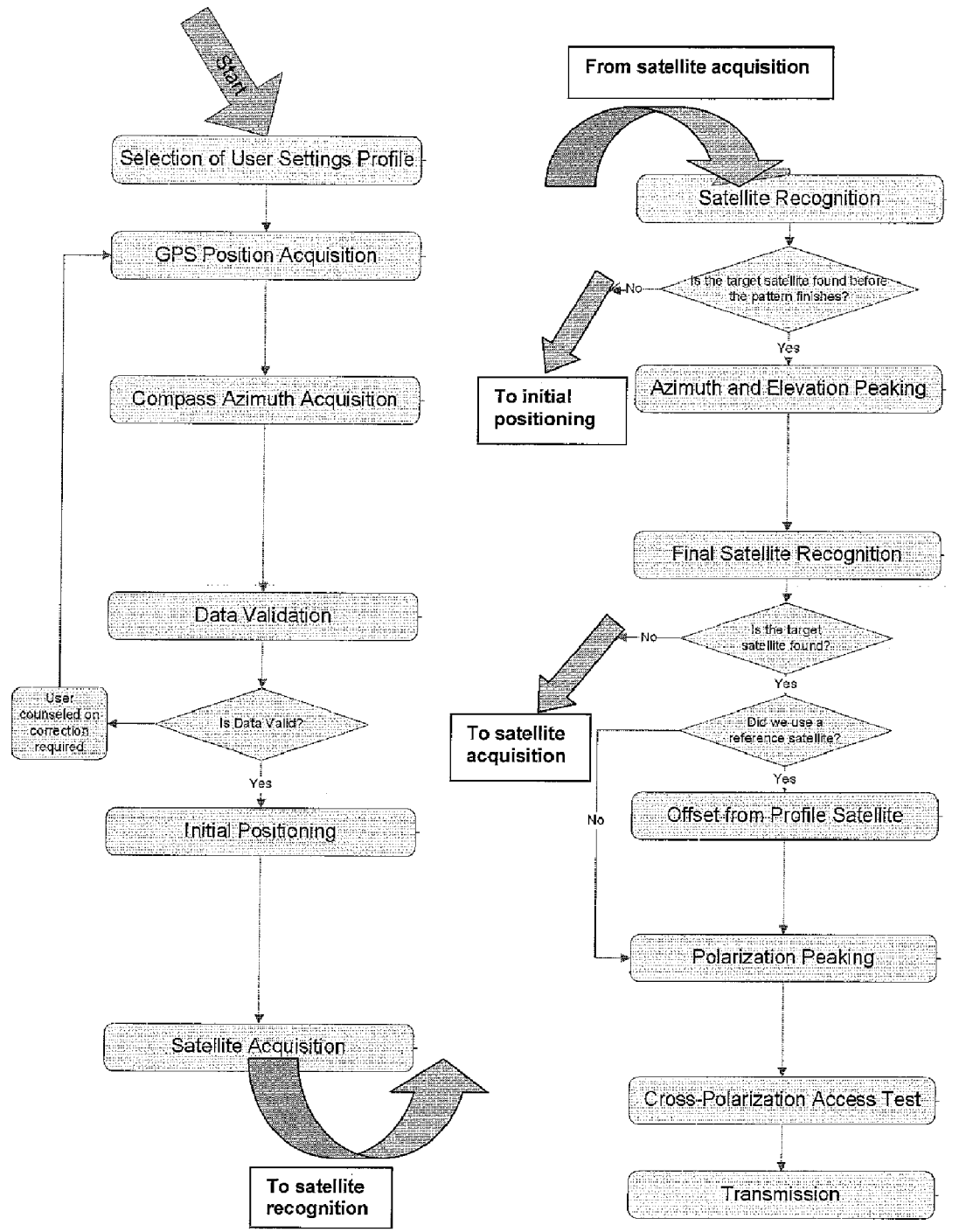
FIG. 8 is a flowchart of the auto-acquire process of the present invention.

FIG. 8 shows a flowchart identifying the steps in the acquisition process.

Selection of Profile

Profiles contain all settings required for acquisition and transmission including, satellite name and location, frequencies, and modem settings. The user is given the options of defining and/or selecting desired profiles.

Determination of Location and Azimuth

The GPS receiver 709 determines the terminal's 100 location, (i.e. its latitude and longitude) and the compass 710 is polled to ascertain the magnetic azimuth pointing of the antenna. The magnetic declination is found from magnetic declination tables (preferably stored in the terminal), using the current position found by the GPS receiver, to determine the antenna's true azimuth.

Data Validation and Satellite Selection

The location and magnetic azimuth data from the GPS and compass are checked for consistency and validated. For location determination, this is done by the software checking the data stream from the GPS for irregularities such as a long succession of zeros, for example. If the data is invalid, or if the GPS 709 does not return any reading at all, the user is prompted to enter his position, either by entering latitude and longitude manually or by selecting a nearby city or landmark from the city database. In the preferred embodiment, the city database includes over 3400 world cities and/or landmarks.

Similarly, if the compass 710 does not return valid results (e.g. if its output data stream is a long succession of zeros) the user is asked to use an external compass and either enter the magnetic azimuth (using the external compass) or to position the antenna as closely as possible to the azimuth value calculated by the software from the terminal's location and the position of the desired satellite.

Using the location data of the terminal 100, the antenna's magnetic azimuth, and the position data of the requested satellite (from the satellite database), the software calculates the look angles and determines if the terminal 100 can actually see the satellite. If the satellite is not in view (e.g. it is below the horizon) the user is advised by the software to choose another satellite. If the satellite is too close to an azimuth limit of the terminal (i.e. if the antenna is aiming too far left or right from the required azimuth setting), the user is prompted to reorient the terminal so that the satellite is closer to the middle of the antenna's range of movement.

The software also searches the satellite database for carrier information pertaining to the requested satellite. If insufficient data is available on the requested satellite, a reference satellite is selected. A weighting algorithm is used to choose a reference satellite from a few (usually two) satellites close to the target satellite. Weights are assigned to parameters like spacing from the desired satellite, conveniently recognizable carriers, strong beacon signals etc.

The target polarisation to be used for the satellite acquisition is not necessarily that identified by the user or specified in the selected profile. If data or digital video carriers are not expected on the polarization identified by the user or specified in the selected profile, and there are more signals from the desired satellite on the opposite polarization, the other polarization is chosen by Link Control as the target polarization.

Calibration

In order to obtain the best possible accuracy for the initial positioning, the following calibration and initialization procedure is carried out for each of the azimuth, elevation and polarization sensors.

For example for azimuth, the software directs the azimuth adjustment motor 702, to move the antenna, (i.e. reflector 101 and boom 102 with OMT/feed 103) to a certain position, typically close to one end of the angular range. It then reads the digital value from the azimuth sensor and asks the user for the real angular value of the antenna azimuth position. After taking at least one more reading and obtaining corresponding real values (e.g. at the other end of the angular range), the software creates a lookup table relating the readings from the sensor to actual angular values (alternatively, or in addition, the conversion from digital values to angular values can also be done using a conversion formula). Link Control then has the ability to find the real azimuth position of the antenna at any point, to the precision and resolution allowed by the azimuth sensor. This calibration process is then repeated for the polarization and elevation sensors.

To obtain finer angular resolution than that available from the sensor, the software preferably takes a very wide sample (typically 90% of the total angular range) and relates motor steps to position. For example, it moves the antenna to within 5% of one limit, and takes the output from the corresponding sensor. It then moves to within 5% of the opposite limit, counting the number of step-motor steps required to complete the move, and again takes the output from the sensor. If the user has specified that there is some amount of slack or backlash, this value is appropriately added or subtracted. For example, the amount of slack is found in initial terminal tests by checking (by trial and error) how many motor steps are needed before the antenna starts moving. This number may be inputted by a user (e.g. via a laptop or touch screen).

The software can then calculate the number of steps required to obtain a 1-degree shift about the axis in question. Because of the large range of the sample and the many steps of the motor, each motor step represents a much smaller fraction of a degree than the resolution of the sensor. This ensures a high resolution and accuracy for small angular shifts.

During initialisation (the preparation of the terminal for initial positioning), the software reads each of the azimuth 703, elevation 706 and polarization 704 sensors and for each sensor assumes that the antenna position corresponds to the centre of a 0.5-degree range associated with the particular value of the sensor output. For example, it assumes that if the lookup table for a particular sensor relates its output to 5 degrees, the antenna is at exactly 5 degrees. The software then sets the corresponding step-motor's step counter to zero. Thus, in this example, an anchor position of 5 degrees corresponding to 0 steps is established, which aids to determine the real antenna position.

During the scanning involved in the satellite acquisition step described below, the software will compute the change in antenna real position in degrees by querying the step position and dividing it by the number of steps per degree found in the step-motor calibration discussed above. The software then adds the delta (i.e. the change in real position) to the anchor position (5 degrees in this example) and returns the computed real angular position. The precision of this calculation is typically much greater than the respective sensor's precision, as there are far more step-motor steps in a limit-to-limit slew than the total number of voltage steps from the respective sensor. Thus the angular change corresponding to one motor step is much smaller than that corresponding to one step from the sensor, resulting in much finer resolution in the antenna adjustment.

To protect against inaccuracy due to motor slippage, the computed position value is periodically checked against the respective sensor position values. As stated before, each sensor has a certain resolution range, defined by $+/-½$ of the sensor step range (e.g. 0.5 degrees) around its centre value. If the computed value is within the resolution range of the corresponding reading from the sensor, no adjustment is made. If the computed value is outside of this resolution range, the software adjusts the position of the above-mentioned anchor value, such that each subsequent calculation will be closer to the output from the sensor. The amount of the adjustment is preferably 10% of the difference between the computed position and the sensor output, and a correction is made typically about every 5 seconds, bringing the computed position back to the correct position gradually.

Satellite Acquisition

The antenna's azimuth, elevation and polarization are set to their initial positions in preparation for satellite acquisition. For elevation and polarization, the initial positions are the on-target calculated (anticipated) values. For the azimuth, the initial position is set to the right or left of the anticipated value. For satellite acquisition, the software then slews the azimuth in a pattern of increasing arcs, (e.g. +/−10 degrees, +/−20 degrees and +/−60 degrees) centred on the anticipated position of the satellite (as found through compass data and look angle calculation). For speed of acquisition it is obviously desirable that the inaccuracy of the azimuth sensor 703 does not add significantly to that of the compass 710. Preferably, the compass-sensor combination is accurate to within less than 10 degrees.

The azimuth slew preferably happens at a rate of 20 degrees per minute. If the beacon detector detects a rise in signal strength (indicating a possible satellite) the slewing slows in order to allow the DVB Receiver 716 and Modem 715 more time to lock. If for some reason the software has to progress to the final arc and slews through the entire 120 degree arc without finding the satellite, it raises the elevation by 1 degree and slews the azimuth again. After that, it lowers the elevation by 2 degrees (1 degree below the initial look position) and slews again. If the satellite is not found, an alternate (reference) satellite and polarization are chosen, the antenna set to the initial position for that reference satellite, and the slewing is performed again. The small elevation range is justified by the fact that there are generally no additional satellites above and below the one being targeted. With azimuth on the other hand, there can be other satellites on both sides of the one being targeted.

Satellite Recognition

The satellite recognition process runs concurrent with the satellite acquisition process using indicators from three system elements: spectrum analyser 712, DVB receiver 716 and modem 715. As is mentioned above, during satellite recognition, the system monitors the strength of the signal from the beacon detector; a rise in signal strength indicates a satellite and the slewing slows down to allow the spectrum analyser 712, DVB receiver 716 and modem 715 more time to recognize the target satellite. The recognition is based on confirming the expected pattern of data carriers (modem lock) and/or digital video carriers (DVB receiver lock) at certain frequencies in the satellite spectrum, as identified by the spectrum analyser.

Satellite acquisition and recognition continue until the target satellite is found and recognized or until the software exhausts the acquisition slew pattern. In the latter case, a new target satellite and polarization is chosen (either by the user or by the software) and the acquisition and recognition processes are started again.

Azimuth and Elevation Peaking

Once the target satellite is acquired and recognized, the azimuth and elevation are peaked as follows.

The peaking procedure first finds an appropriate frequency to monitor with the beacon detector (the beacon detector forms part of the Spectrum Analyzer 712) by searching through the receive band (i.e. the frequency range in which the satellite is transmitting signals to earth stations) to find the five strongest signals and polls each of them to find the most stable one. The beacon detector is then set to the most-stable frequency, and the azimuth and elevation are nudged left or right, up or down, in small steps until the peak is found and the carrier strength starts to decline. The direction of "nudging" is then reversed, and the peak is confirmed.

Final Satellite Recognition

Once the azimuth and elevation are peaked, the satellite recognition process is run again to ensure that the satellite is correct, this time with more stringent requirements. As before, the system is looking for DVB carriers or for data carriers expected to be present on the target polarization. However, to obtain even greater certainty, the polarization (i.e. the angular position of the OMT/feed) can be changed by 90 degrees (i.e. to opposite polarization). There will be a pattern of data and/or video carriers on the opposite polarization and this will be checked and compared with the pattern expected for that polarization. If the pattern of data and/or video carriers does not match what is expected from the satellite, the software goes back to the satellite acquisition as described in the "Satellite Acquisition" section above.

Offset to Reference

Once the satellite has been recognized, if a reference satellite is used for the acquisition and recognition processes, the angular corrections required to change the direction of the antenna from the reference satellite to the desired satellite are calculated and the antenna is adjusted to the correct position (i.e. azimuth, elevation and polarization aligned with the desired satellite). The azimuth and elevation are then peaked again, using the method described above.

Polarization Peaking

Polarization peaking is normally done by maximizing the signal being received on that polarization. However, such adjustment can be inaccurate because of the small changes in signal strength around the peak. This is a problem since polarization peaking is important, not so much for maximizing the signal but rather for minimizing the interference from the signal on the opposite polarization. Even a small deviation from optimum can sometimes cause a significant interference problem. Thus the most effective way to peak polarization accurately is to choose a strong signal on the opposite polarization and minimize it by watching the signal strength, while adjusting the polarization angle. The signal intensity changes around the minimum are much sharper and thus the result is more accurate. However, the latter method is useful only with direct observation using a very sensitive device that can accurately evaluate very low signal levels. Such devices are usually stand-alone full-featured spectrum analyzers, which are too large to be incorporated into a portable satellite terminal.

The present invention therefore uses the former method and overcomes the accuracy problem by incorporating in the software a procedure that makes the maximization of the signal on the desired polarization more accurate. The procedure simulates the dependence of the measured signal strength on the polarization angle by a mathematical function and uses that function to determine the precise location of the maximum. The function is derived not just from a few measurement points around the maximum but from measurements over a larger polarization angle range. This avoids the inability of the measuring equipment (i.e. RSSI) to recognize the extremely small signal variations around the maximum. This procedure consists of several steps as follows:

a) the software determines the optimal monitoring frequency for the desired polarization (horizontal or vertical) as follows:

It takes signal strength measurements across the entire receive band, preferably at intervals of 10 MHz, with the polarization alternately set to both the home polarization and 90 degrees away from the home polarization, (i.e. at the opposite polarization) such that "home" and "opposite" measurements are taken at each interval. It assumes that the polarization angle sensor is calibrated accurately enough to get reasonably good approximations of the correct positions for "home" and "opposite" polarization.

It compares each point on the home polarization with each corresponding point on the opposite polarization (such that each comparison pair shares the same frequency). It determines the five points with the greatest disparity, that is, where the home polarization's signal is much higher than the opposite polarization's signal. This will guarantee that a polarization slew off the peak will result in the most rapid drop in signal strength.

It then takes a number of readings (preferably 10) at each of the five frequencies of greatest disparity. It determines the variability of the readings over time at each frequency, finds the frequency which displays the least variability over time, and chooses that as the frequency for the rest of the polarization peaking procedure.

b) the software plots a graph of the signal strength as it slews through a polarization arc around the desired polarization angle, i.e. the angle that was previously calculated from satellite and location data to yield the strongest signal (calculated peak point):

It assumes that the calibrated polarization angle sensor is sufficiently accurate so that using its reading makes it possible to align the OMT/feed reasonably close to the calculated peak point, It slews from one side of the calculated peak point to the other side, (preferably from 40 degrees to one side to 40 degrees to the other side) taking signal strength measurements each 1 degree. Thus, in the preferred embodiment 81 data points will be taken. This slewing procedure preferably respects the limits defined by the user—so if an end point would be out-of-bounds, the limit is substituted for that end point.

In order to reduce variability of the readings and to smooth out the plotted line of data points, it takes a measurement at each point a number of times (typically 20) and averages the result. It stores the resultant average signal strength of each point, along with the corresponding step-motor step position in an array.

c) the software approximates the measured average signal strength from the RSSI by a mathematical function, computing the parameters of that function in a way that yields the "least-squares", or lowest sum of differences squared, between the calculated line and the actual data points found. One such function closely approximating the signal strength from the RSSI in relation to polarization angle is described by the expression:

$$y = Y\_Offset + sqrt[\sin(x * X\_Scale + X\_Offset)] * Y\_Scale,$$

where y is signal strength, x is the polarization angle, Yoffset is a shift in the value of signal stregth, Xoffset is a shift in the value of the polarization angle, Yscale is a coefficient that, depending on its value acts as magnifier or reducer of the signal strength, and Xscale is a similar coefficient that acts as a magnifier or reducer of the polarization angle value. The above function or equation, without the parameters (i.e. with Yoffset=0, Xoffset=0, Yscale=1 and Xscale=1) would have the same basic shape when plotted on a graph as the curve of plotted measured data but would likely be shifted sideways and up/down and be of different size then the curve of the measured data. The sideways shift is corrected by Xoffset, the up/down shift by Yoffset, and the size by Yscale (in the Y direction of the plot) and Xscale (in the X direction of the plot).

Another function that can be used is:

$$y = Y\_Offset + Y\_Scale * \log[\sin(x * X\_Scale + X\_Offset)]$$

with the same definition of variables and parameters as in the former function. Other mathematical functions may be used to approximate measured average signal strength, as will be apparent to persons skilled in the art.

The values of these parameters are determined during the optimization process as outlined below.

The software first calculates initial values of the four parameters. Although there are a number of acceptable means for selecting initial values, in the preferred embodiment this is done by selecting values for the parameters that result in a curve or mathematical function that agrees with the measured data at the centre and at the two limits of the polarization angle range (i.e the polarization slew limits in step (b) above).

For each measured data point, the software finds the difference along the Y axis between the measured data point and the calculated value based on the initial values of the four parameters. It squares that difference, and adds all the squares together to come up with a "sum-of-squares".

It then changes each of the four parameters incrementally and calculates the new sum-of-squares. If some combination of parameters yields a lower sum-of-squares, the new values are used.

It repeats this process until it finds that any deviations from the latest set of parameter values yields a larger sum-of-squares, indicating that it has found the most accurate synthesized characterization of the data points possible.

d) the software determines the position of the peak of the function incorporating the parameter values resulting in the lowest sum-of-squares (i.e. the calculated polarization angle having the highest signal strength). The polarization feed is then moved to this position.

The step-motor position information gathered during the calibration and initialization steps is used to accurately position the feed at the desired position.

Cross-Polarization Access Test

The user is prompted by the software to call the access provider or satellite operator. If the satellite operator requires a cross-polarization access test, the software runs through the following procedure: it confirms the polarization and frequency of the access test and transmits a Continuous Wave. The user then adjusts power and polarization (should it be required) manually, under direction of the satellite operator. At the end of the access, the frequency is reset to the profile's frequency.

Transmission

The user is prompted to start transmission, which is then maintained by the software. This involves monitoring the system status and reacting as required, (e.g. keeping RF output power constant with changing ambient temperature).

What is claimed is:

1. A method of determining a peak polarization of a communication signal comprising:

a) making a first group of signal strength measurements, wherein said first group of signal strength measurements includes a pair of measurements at each frequency in a first group of frequencies in a receive band of said signal, wherein each said pair of measurements includes a first signal strength measurement at a polarization angle corresponding to a home polarization and a second signal strength measurement at a polarization opposite to said home polarization;

b) selecting at least one frequency from said first group of frequencies for which a corresponding one of said pairs of signal strength measurements has a greater difference between said first signal strength measurement and said second signal strength measurement than the non-selected frequencies from said first group of frequencies;

c) making a second group of signal strength measurements, wherein said second group of signal strength measurements includes a plurality of pairs of measurements at each one of said selected frequencies, wherein each said pair of measurements in said second group includes a first signal strength measurement at said home polarization and a second signal strength measurement at said polarization opposite to said home polarization;

d) identifying a frequency for which said differences in said pairs of measurements in said second group of signal strength measurements display the lowest variability;

e) making a third group of signal strength measurements at said identified frequency, wherein said third group of signal strength measurements includes a plurality of signal strength measurements at each one of a plurality of signal polarization angles, and wherein said plurality of signal polarization angles represents a range of polarization angles about said home polarization;

f) for each one of said plurality of signal polarization angles determining an average signal strength measurement;

g) approximating said average signal strength measurements for each of said plurality of signal polarization angles with a mathematical function adjusting parameters of said mathematical function to yield a lowest sum-of-squares difference between said mathematical function and said average signal strength measurements;

h) determining a peak of said mathematical function for determining a peak polarization angle of the communication signal.

2. The method of claim 1, wherein said signal strength measurements are made at predetermined frequency intervals.

3. The method of claim 2, wherein said signal strength measurements are made at frequency intervals of 10 MHz.

4. The method of claim 1, wherein in said second group of signal strength measurements 10 pairs of measurements are taken at each one of said selected frequencies.

5. The method of claim 1, wherein said polarization angles are separated by intervals of 1 degree and wherein said range of polarization angles about said home polarization extends from 40 degrees to one side of said home polarization to 40 degrees to the other side of said home polarization.

6. The method of claim 1, wherein said third group of signal strength measurements includes 20 measurements at each one of said plurality of signal polarization angles.

7. The method of claim 1, wherein said third group of signal strength measurements are processed to yield an average signal strength value at each one of said plurality of signal polarization angles.

8. The method of claim 7, wherein said average signal strength values and corresponding step-motor step positions are stored in an array.

9. The method of claim 1, wherein after said peak of said function has been determined, a feed of a satellite terminal is aligned with a polarization angle corresponding to said peak of said function.

10. The method of claim 1, wherein said mathematical function is:

$$y = Y\text{Offset} + sqrt[\sin(x*X\text{Scale} + X\text{Offset})]*Y\text{Scale}$$

where y is signal strength, x is polarization angle, Y Offset is a shift in signal strength, X Offset is a shift in polarization angle, Yscale is a coefficient that modifies signal strength magnitude, and Xscale is a coefficient that adjusts polarization angle magnitude.

11. The method of claim 1, wherein said mathematical function is:

$$y = Y\text{Offset} + \log[\sin(x*X\text{Scale} + X\text{Offset})]*Y\text{Scale}$$

where y is signal strength, x is polarization angle, Y Offset is a shift in signal strength, X Offset is a shift in polarization angle, Yscale is a coefficient that modifies signal strength magnitude, and Xscale is a coefficient that adjusts polarization angle magnitude.

12. A computer program product for determining a peak polarization of a communication signal received by a portable satellite terminal, the program product comprising computer readable program code means for:

a) making a first group of signal strength measurements, wherein said first group of signal strength measurements includes a pair of measurements at each frequency in a first group of frequencies in a receive band of said signal, wherein each said pair of measurements includes a first signal strength measurement at a polarization angle corresponding to a home polarization and a second signal strength measurement at a polarization opposite to said home polarization;

b) selecting at least one frequency from said first group of frequencies for which a corresponding one of said pairs of signal strength measurements has a greater difference between said first signal strength measurement and said second signal strength measurement than the non-selected frequencies from said first group of frequencies;

c) making a second group of signal strength measurements, wherein said second group of signal strength measurements includes a plurality of pairs of measurements at each one of said selected frequencies, wherein each said pair of measurements in said second group includes a first signal strength measurement at said home polarization and a second signal strength measurement at said polarization opposite to said home polarization;

d) identifying a frequency for which said differences in said pairs of measurements in said second group of signal strength measurements display the lowest variability;

e) making a third group of signal strength measurements at said identified frequency, wherein said third group of signal strength measurements includes a plurality of signal strength measurements at each one of a plurality of signal polarization angles, and wherein said plurality of signal polarization angles represents a range of polarization angles about said home polarization;

f) for each one of said plurality of signal polarization angles determining an average signal strength measurement;

g) approximating said average signal strength measurements for each of said plurality of signal polarization angles with a mathematical function adjusting parameters of said mathematical function to yield a lowest sum-of-squares difference between said mathematical function and said average signal strength measurements;

h) determining a peak of said mathematical function for determining a peak polarization angle of the communication signal.

13. The computer program product of claim 12, wherein said signal strength measurements are made at predetermined frequency intervals.

14. The computer program product of claim 13, wherein said signal strength measurements are made at frequency intervals of 10 MHz.

15. The computer program product of claim 12, wherein in said second group of signal strength measurements 10 pairs of measurements are taken at each one of said selected frequencies.

16. The computer program product of claim 12, wherein said polarization angles are separated by intervals of 1 degree and wherein said range of polarization angles about said home polarization extends from 40 degrees to one side of said home polarization to 40 degrees to the other side of said home polarization.

17. The computer program product of claim 12, wherein said third group of signal strength measurements includes 20 measurements at each one of said plurality of signal polarization angles.

18. The computer program product of claim 12, wherein said third group of signal strength measurements are processed to yield an average signal strength value at each one of said plurality of signal polarization angles.

19. The computer program product of claim 18, wherein said average signal strength values and corresponding stepmotor step positions are stored in an array.

20. The computer program product of claim 12, wherein after said peak of said function has been determined, a feed of a satellite terminal is aligned with a polarization angle corresponding to said peak of said function.

21. The computer program product of claim 12, wherein said mathematical function is:

$y = Y\text{Offset} + sqrt[\sin(x*X\text{Scale} + X\text{Offset})]*Y\text{Scale}$ where y is signal strength, x is polarization angle, Y Offset is a shift in signal strength, X Offset is a shift in polarization angle, Yscale is a coefficient that modifies signal strength magnitude, and Xscale is a coefficient that adjusts polarization angle magnitude.

22. The computer program product of claim 12, wherein said mathematical function is:

$y = Y\text{Offset} + \log[\sin(x*X\text{Scale} + X\text{Offset})]*Y\text{Scale}$ where y is signal strength, x is polarization angle, Y Offset is a shift in signal strength, X Offset is a shift in polarization angle, Yscale is a coefficient that modifies signal strength magnitude, and Xscale is a coefficient that adjusts polarization angle magnitude.

* * * * *